(12) United States Patent
Hussain

(10) Patent No.: US 6,205,865 B1
(45) Date of Patent: *Mar. 27, 2001

(54) MASS FLOW METER

(75) Inventor: Yousif A. Hussain, Weston Favell (GB)

(73) Assignee: Hedstrom Corporation, Bedford, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/524,933

(22) Filed: Mar. 14, 2000

Related U.S. Application Data

(63) Continuation of application No. 09/051,650, filed as application No. PCT/EP97/04324 on Aug. 8, 1997, now Pat. No. 6,082,202.

(30) Foreign Application Priority Data

Aug. 12, 1996 (DE) .............................................. 196 32 500

(51) Int. Cl.⁷ ...................................................... G01F 1/84
(52) U.S. Cl. ...................................................... 73/861.357
(58) Field of Search ....................... 73/861.355, 861.356, 73/861.357

(56) References Cited

U.S. PATENT DOCUMENTS

| | | | |
|---|---|---|---|
| 4,127,028 | * 11/1978 | Cox et al. .............................. | 73/194 |
| 4,803,867 | * 2/1989 | Dahlin .................................... | 73/32 |
| 4,823,614 | * 4/1989 | Dahlin .................................... | 73/861.38 |
| 5,365,794 | * 11/1994 | Hussain et al. ........................ | 73/861.357 |
| 5,398,554 | * 3/1995 | Ogawa et al. .......................... | 73/861.357 |
| 5,531,126 | * 7/1996 | Drahm .................................... | 73/861 |

* cited by examiner

*Primary Examiner*—Harshad Patel
(74) *Attorney, Agent, or Firm*—Cesari and McKenna

(57) ABSTRACT

A mass flowmeter for flowing media, which operates according to the Coriolis principle, with one at least basically straight Coriolis line guiding the flowing medium, with at least one oscillation generator acting on the Coriolis line, with at least one sensor detecting Coriolis oscillations based on a Coriolis force and/or Coriolis forces, and with a compensation cylinder, the Coriolis line being located within the compensation cylinder and mechanically connected with the compensation cylinder. According to the invention, the mass flowmeter is designed and further developed so that the oscillation properties of the compensation cylinder essentially correspond to those of the Coriolis line, so that, during operation, the compensation cylinder and the Coriolis line oscillate opposite one another in the manner of a tuning fork.

7 Claims, 3 Drawing Sheets

MASS FLOW METER

RELATED APPLICATION

This application is a continuation of Ser. No. 09/051,650, filed Feb. 16, 1999, now U.S. Pat. Ser. No. 6,082,202, which is a 371 of PCT/EP97/04324, filed Aug. 8, 1997.

The invention concerns a mass flowmeter for flowing media, which operates according to the Coriolis principle, with one at least basically straight Coriolis line guiding the flowing medium, with at least one oscillation generator acting on the Coriolis line, with at least one sensor detecting Coriolis oscillations based on a Coriolis force and/or Coriolis forces, and with a compensation cylinder, the Coriolis line being located within the compensation cylinder and mechanically connected with the compensation cylinder.

BACKGROUND OF THE INVENTION

A mass flowmeter for flowing media of the above-mentioned type is known, for example from DE-A-41 24 295. As opposed to the mass flowmeters also known with two parallel Coriolis lines, which operate in the manner of a tuning fork (cf. e.g. U.S. Pat. No. 4,127,028), in the case of this known mass flowmeter, it is a problem that its center of mass oscillates back and forth, so that the possibility for introducing disturbing oscillations is greater, again resulting in loss of measurement accuracy.

In the case of the known mass flowmeters, in the case of which two parallel Coriolis lines are operated in the manner of a tuning fork, it is a problem that they have an increased flow resistance because of a complicated line course, and at the same time they can be cleaned only at increased expense. Precisely the last problem obtains also for mass flowmeters with parallel straight Coriolis lines (cf. e.g. DE C-34 43 234).

SUMMARY OF THE INVENTION

Thus the object of the invention is to improve the measuring accuracy of the known mass flowmeter for flowing media, which operates according to the Coriolis principle, while retaining its basic advantages.

The problem indicated and derived previously is solved in accordance with the invention by having the oscillation properties of the compensation cylinder essentially correspond to those of the Coriolis line.

The design of the mass flowmeter for flowing media in accordance with the invention ensures that the Coriolis line and the compensation cylinder oscillate opposite one another at least essentially in the manner of a tuning fork. In this way, the oscillation of the center of mass of the mass flowmeter is reduced to a small amount, if not entirely eliminated, by means of which the possibility of coupling disturbing oscillations is reduced and thus the measurement accuracy is increased.

The adjustment of the oscillation properties, in particular of the mass, the spring constant, and the attenuation constant, of the compensation cylinder to those of the Coriolis line is made significantly easier when the compensation cylinder and the Coriolis line consist of the same material. Titanium is used regularly as a material for the Coriolis line, so that titanium also is recommended as a material for the compensation cylinder.

A further advantageous design of the mass flowmeter in accordance with the invention consists in having the Coriolis line and the compensation cylinder located within a second compensation cylinder connected mechanically with the Coriolis line. The disclosure of DE A-41 24 295, for example, is to be consulted with respect to the design of this second compensation cylinder. For example, the Coriolis line can be located within the second compensation cylinder under initial tensile stress.

If, in accordance with one design of the invention, the oscillation generator is located between the compensation cylinder and the Coriolis line, this ensures that the compensation cylinder and the Coriolis line in each case oscillate in the manner of a tuning fork.

In the case of corresponding accommodation of the oscillation properties of the compensation cylinder and the Coriolis line, the oscillation opposite to each other in the manner of a tuning fork also is ensured when the oscillation generator is located between the second compensation cylinder and the compensation cylinder.

If, in accordance with a further advantageous design, the sensors are located between the compensation cylinder and the Coriolis line, an especially simple production of the mass flowmeter is ensured.

As an alternative to the design last described, it can be advantageous to locate the sensor between the second compensation cylinder and the Coriolis line, since in this way the influence of phase shifts of the oscillation of the first compensation cylinder is reduced. These phase shifts arise because the flowing medium flows only through the Coriolis line and not through the first compensation cylinder.

The phase shifts of the oscillation of the first compensation cylinder can be reduced in accordance with a further design of the invention by locating at least two control or correcting elements between the second compensation cylinder and the first compensation cylinder in order to eliminate just these phase shifts.

Since the oscillation properties of the first compensation cylinder do not exactly correspond to those of the Coriolis lines because of the usually non-uniform density of the flowing medium, it is advantageous to locate a correcting element between the second compensation cylinder and the first compensation cylinder in order to eliminate the medium density-dependent mass difference between the first compensation cylinder and the Coriolis line.

A particularly advantageous design of the mass flowmeter in accordance with the invention consists in having the first compensation cylinder form the second compensation cylinder at the same time. In this case, the single compensation cylinder must be designed in such a way that, on the one hand, it has essentially the same oscillation properties as the Coriolis line and, on the other hand, at the same time, for example, the Coriolis line is under initial tensile stress. In this case it is advantageous to make the single compensation cylinder out of Invar.

In particular, there are now a number of possibilities for designing and further developing the mass flowmeter for flowing media in accordance with the invention, which operates according to the Coriolis principle. For this purpose reference is made, on the one hand, to the dependent patent claims and, on the other hand, to the description of preferred embodiments in connection with the drawings.

DETAILED DESCRIPTION OF ILLUSTRATIVE EMBODIMENTS

Figure 1:
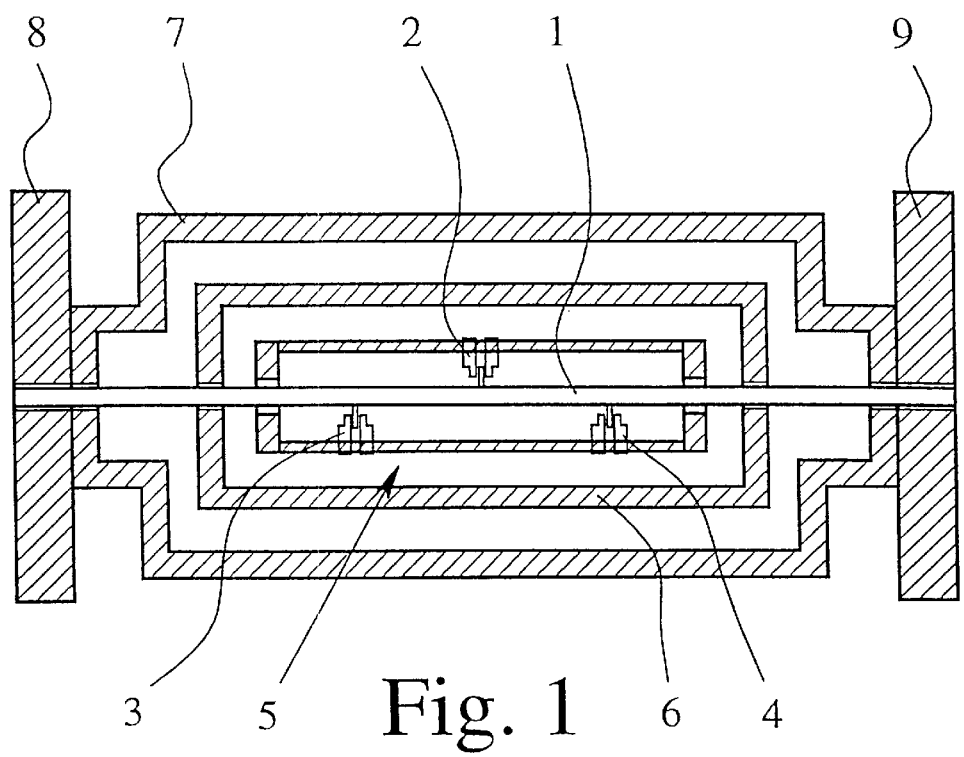
FIG. 1 shows a schematic representation of a first embodiment of the mass flowmeter in accordance with the invention.

FIG. 1 of the drawing shows a mass flowmeter for flowing media, which operates according to the Coriolis principle, with one at least basically straight Coriolis line 1 guiding the flowing medium, with one oscillation generator 2 acting on the Coriolis line 1, with two sensors 3, 4 detecting Coriolis oscillations based on Coriolis forces, and with a compensation cylinder 5 through which the medium does not flow. In this case, the Coriolis line 1 is located within the compensation cylinder 5 and connected with it mechanically. In accordance with the invention, the mass flowmeter shown in FIG. 1 is designed in such a way that the oscillation properties of the compensation cylinder 5 essentially correspond to those of the Coriolis line 1.

In the case of the first embodiment shown in FIG. 1, the Coriolis line 1 and the compensation cylinder 5 are located within a second compensation cylinder 6 mechanically connected with the Coriolis line 1 in a way excluding axial relative motions. This arrangement is made, for example, in such a way that the Coriolis line 1 is located within the second compensation cylinder 6 with initial tensile stressing. Further, FIG. 1 shows an outer housing 7, which serves as mechanical protection and, in addition to that, bears mounting flanges 8, 9.

In the case of the first embodiment shown in FIG. 1, the oscillation generator 2 is located between the first compensation cylinder 5 and the Coriolis line 1. In this embodiment, the sensors 3, 4 are also located between the first compensation cylinder 5 and the Coriolis line 1.

The structure of the second embodiment first of all basically corresponds to the first embodiment. All identical components are provided with the same reference numbers. In addition, in the case of the second embodiment shown in FIG. 2, two control elements 10, 11 are located on the ends of the first compensation cylinder 5 situated between the second compensation cylinder 6 and the first compensation cylinder 5, in order to eliminate phase shifts. Suitable control elements are known from EP 0 598 287A1 incorporated herein by reference.

Figure 2:
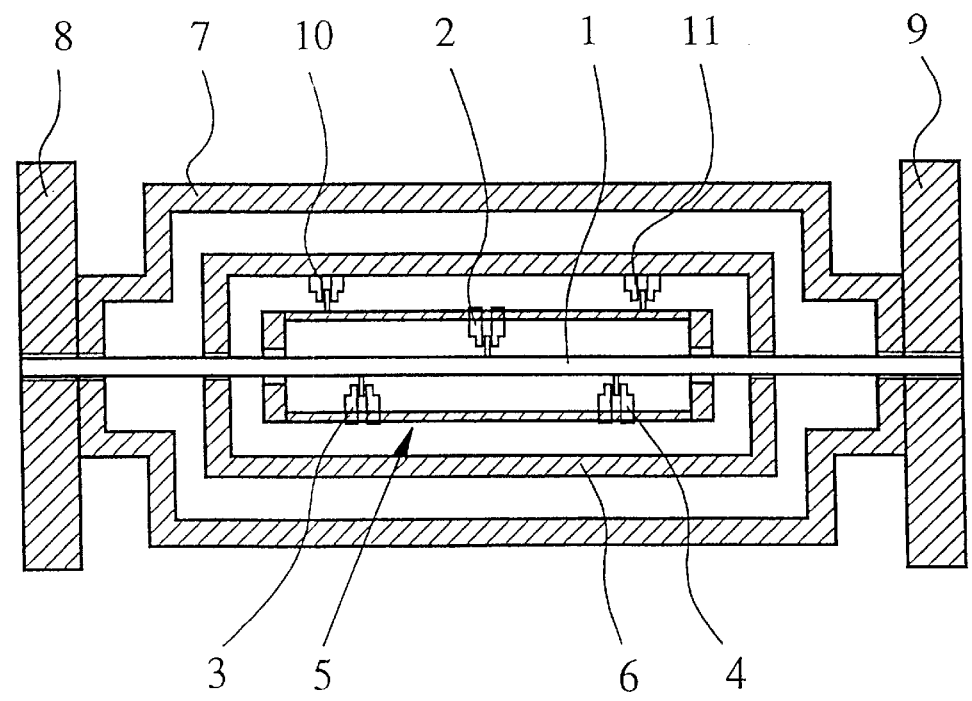
FIG. 2 shows a schematic representation of a second embodiment of the mass flowmeter in accordance with the invention.
Figure 3:
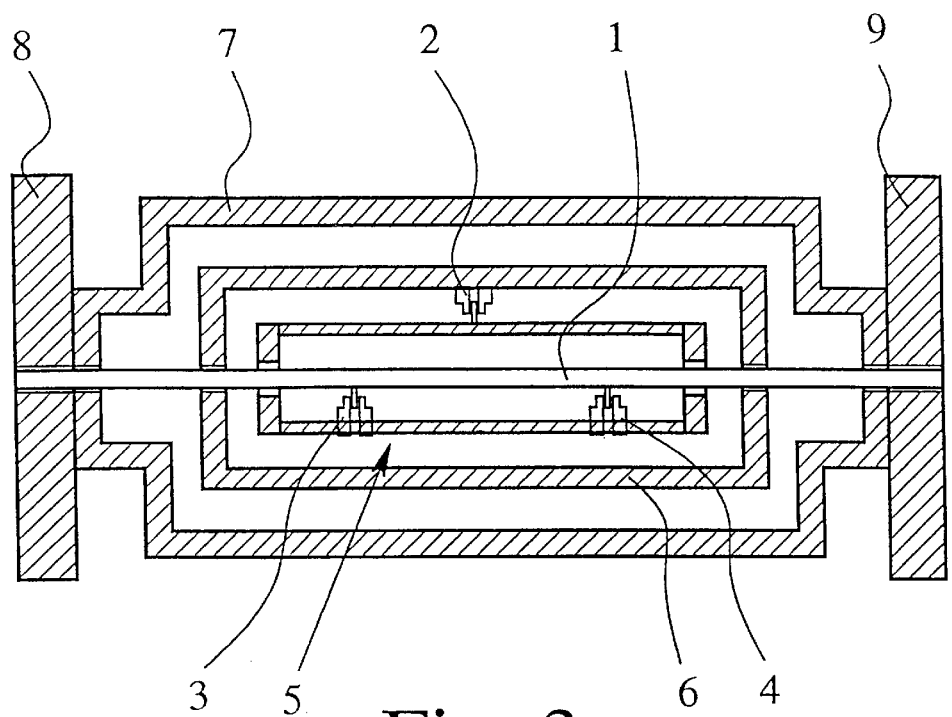
FIG. 3 shows a schematic representation of a third embodiment of the mass flowmeter in accordance with the invention.

The third embodiment of the mass flowmeter shown in FIG. 3 differs from the second embodiment shown in FIG. 2 in that the oscillation generator 2 is located between the second compensation cylinder 6 and the first compensation cylinder 5. Since the first compensation cylinder 5 and the Coriolis line 1 are connected with one another mechanically, the oscillations of the first compensation cylinder 5 also are transferred, as necessary for the measurement, to the Coriolis line 1.

Figure 4:
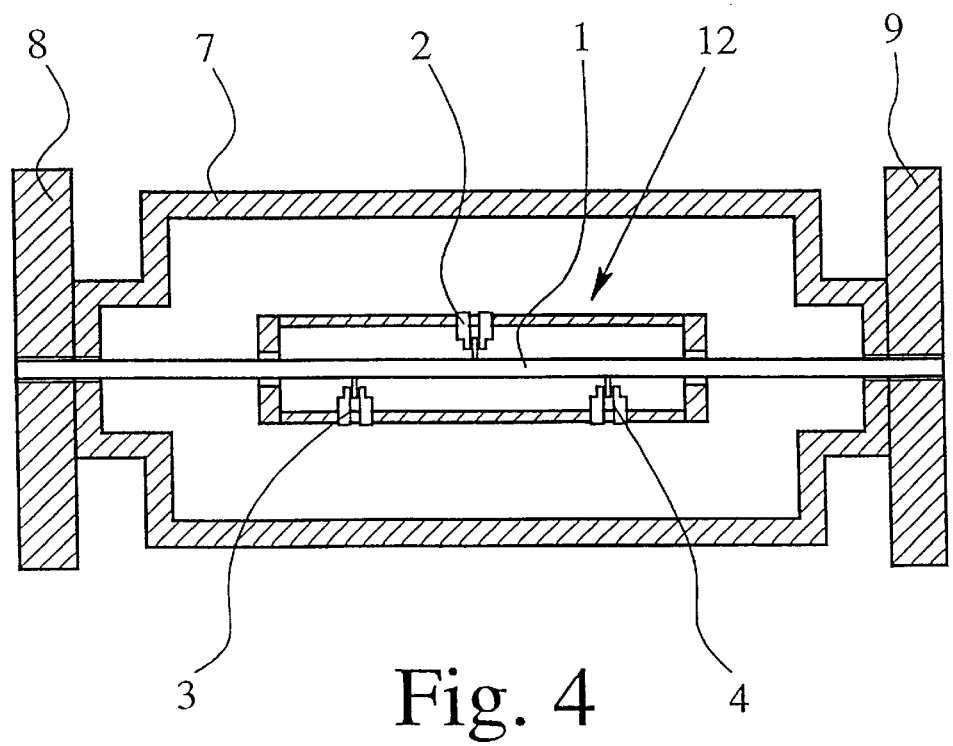
FIG. 4 shows a schematic representation of a fourth embodiment of the mass flowmeter in accordance with the invention.

FIG. 4 shows a fourth embodiment of a mass flowmeter in accordance with the invention, in the case of which a single compensation cylinder 12 simultaneously assumes the function of the first compensation cylinder and the second compensation cylinder. This means, on the one hand, that the oscillation properties of this single compensation cylinder 12 essentially correspond to those of the Coriolis line 1, and that at the same time, on the other hand, the Coriolis line 1 is located in the single compensation cylinder 12 under initial tensile stress.

Figure 5:
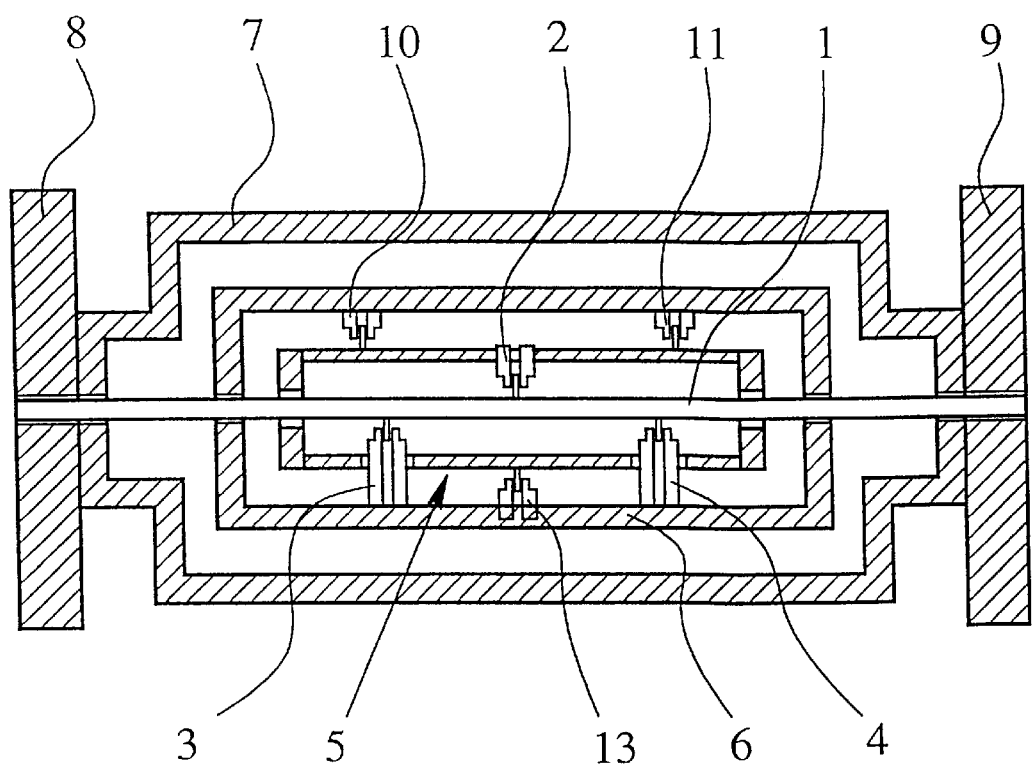
FIG. 5 shows a schematic representation of the fifth embodiment of the mass flowmeter in accordance with the invention.

Finally, FIG. 5 shows a fifth embodiment of the mass flowmeter in accordance with the invention, in the case of which the oscillation generator 2 is located between the first compensation cylinder 5 and the Coriolis line 1. The sensors 3, 4 are located between the second compensation cylinder 6 and the Coriolis line 1. Two correcting elements 10, 11 for eliminating phase shifts of the oscillation of the first compensation cylinder 5 are located between the second compensation cylinder 6 and the first compensation cylinder 5, and finally, a further control correcting 13 (see EP 0 598 287A1) for eliminating the medium density-dependent mass difference between the first compensation cylinder 5 and the Coriolis line 1 is located between the second compensation cylinder 6 and the first compensation cylinder 5.

What is claimed is:

1. A mass flowmeter for flowing media, which operates according to the Coriolis principle, with one at least essentially straight Coriolis line guiding the flowing medium, with at least one oscillation generator acting on the Coriolis line, with at least one sensor detecting Coriolis oscillations based on a Coriolis force, with a first compensation cylinder and with a second compensation cylinder, the Coriolis line being located within the first compensation cylinder and mechanically connected with the first compensation cylinder, wherein the oscillation properties of the first compensation cylinder essentially—correspond to those of the Coriolis line, wherein the Coriolis line and the first compensation cylinder are located within the second compensation cylinder and the Coriolis line is connected with the second compensation cylinder, and wherein at least two correcting elements for eliminating phase shifts during the oscillation of the first compensation cylinder are located between the second compensation cylinder and the first compensation cylinder.

2. The mass flowmeter in accordance with claim 1, wherein the first compensation cylinder and the Coriolis line consist of the same material.

3. The mass flowmeter in accordance with claim 1 or 2, wherein the oscillation generator is located between the first compensation cylinder and the Coriolis line.

4. The mass flowmeter in accordance with claim 1 or 2, wherein the oscillation generator is located between the second compensation cylinder and the first compensation cylinder.

5. The mass flowmeter in accordance with claim 1 or 2, wherein said at least one sensor is located between the first compensation cylinder and the Coriolis line.

6. The mass flowmeter in accordance with claim 1 or 2, wherein said at least one sensor is located between the second compensation cylinder and the Coriolis line.

7. The mass flowmeter in accordance with claim 1 or 2, wherein an additional correcting element for eliminating any medium density-dependent mass difference between the first compensation cylinder and the Coriolis line is located between the second compensation cylinder and the first compensation cylinder.

* * * * *

UNITED STATES PATENT AND TRADEMARK OFFICE
CERTIFICATE OF CORRECTION

PATENT NO. : 6,205,865 B1
DATED : March 27, 2001
INVENTOR(S) : Yousif A. Hussain It is certified that error appears in the above-identified patent and that said Letters Patent is hereby corrected as shown below:

<u>Title page,</u>
Field [73], the assignee should be -- Krohne AG, Basel Switzerland --.

Signed and Sealed this

Thirtieth Day of October, 2001

*Attest:*

*Attesting Officer*

NICHOLAS P. GODICI
*Acting Director of the United States Patent and Trademark Office*